United States Statutory Invention Registration [19]

[11] Reg. Number: H768

Kline et al.

[43] Published: Apr. 3, 1990

[54] PROJECTILE FOR LIMITED RANGE TRAINING AMMUNITION

[75] Inventors: Roy W. Kline, Newton, N.J.; Sung-Kwong Chung, Brooklyn, N.Y.

[73] Assignee: The United States of America as represented by the Secretary of the Army, Washington, D.C.

[21] Appl. No.: 387,743

[22] Filed: Jul. 31, 1989

[51] Int. Cl.[4] ..... F42B 8/00

[52] U.S. Cl. ..... 102/529; 244/33

[58] Field of Search ..... 102/385, 395, 430, 439, 102/444, 526, 527, 529, 498, 502, 529; 244/3.3

[56] References Cited

U.S. PATENT DOCUMENTS

| | | | |
|---|---|---|---|
| 3,857,339 | 12/1974 | Grandy | 102/430 |
| 4,520,972 | 6/1985 | Diesinger et al. | 102/529 |

FOREIGN PATENT DOCUMENTS

| | | | |
|---|---|---|---|
| 2831574 | 2/1979 | Fed. Rep. of Germany | 102/529 |
| 496519 | 8/1919 | France | 244/3.3 |
| 2286364 | 4/1976 | France | 102/529 |
| 2091856 | 8/1982 | United Kingdom | 102/529 |
| 2197057 | 5/1988 | United Kingdom | 102/529 |

*Primary Examiner*—Harold J. Tudor

*Attorney, Agent, or Firm*—Anthony T. Lane; Edward Goldberg; Edward F. Costigan

[57] ABSTRACT

A ball or projectile for small caliber ammunition is disclosed. The projectile is useful in training ammunition for the training of personnel on firing ranges having a limited area and a maximum range which is below the range of the standard service round for the weapon on which the training is conducted. The projectile has a body including an ogival forward section, a cylindrical center section, and a conical trailing section. A plurality of fins is mounted longitudinally on the conical trailing section for generating spin dampening torque to cause gyroscopic instability and thereby create high aerodynamic drag upon said projectile when fired from a weapon.

1 Claim, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROJECTILE FOR LIMITED RANGE TRAINING AMMUNITION

GOVERNMENTAL INTEREST

The invention described herein may be manufactured, used and licensed by or for the Government for Governmental purposes without payment to us of any royalties.

BACKGROUND OF THE INVENTION

The present invention relates to ammunition for low caliber weapons. In particular, the invention relates to ammunition for low caliber weapons containing an improved ball for training purposes. More particularly, the present invention relates to a projectile or ball for training ammunition which must have a limited range.

As used herein, the term "ball" is defined as a bullet for general use, as distinguished from bullets for special uses such as armor-piercing, incendiary, or high explosives. In particular, the term "ball" relates to any low caliber projectile regardless of its shape.

Many military training facilities do not have sufficient real estate to accommodate the range of standard ammunition, yet they are required to provide a realistic training environment. The training ammunition must ballistically match the standard ammunition for the weapon to the maximum range of interest. Additionally, it should be similar in appearance to the standard ammunition in order to afford realistic training.

In order to find an appropriate ball for a limited range training ammunition, both plastic balls and steel probe nose rounds have been studied and their performance was determined to not be as required. The maximum range of the plastic ball at 40° quadrant elevation was found to be about 2936 meters, and the steel probe nose round was found to have a range of about 3957 meters. In contrast, the required maximum range for limited range training ammunition is 2500 meters. Thus, both the plastic ball and the steel probe nose rounds exceeded the safety limit for range. In addition, in the testing of .50 caliber plastic ball rounds, the mass of the rounds was found to be insufficient to generate enough recoil for recycling the M2 Machine Gun at a satisfactory level. Moreover, neither the plastic ball rounds nor the steel probe nose rounds looked similar to the Caliber .50, M33 ball. This has an effect upon the reality of the training environment, since the Caliber .50, M33 ball is the standard service round for the M2 Machine Gun.

Accordingly, it is an object of the present invention to provide small caliber training ammunition containing a projectile having a limited range.

It is a further object of the present invention to provide training ammunition containing a projectile having limited range, which is similar in appearance to the standard ammunition for the weapon in use.

It is a further object of the present invention to provide such ammunition, wherein the expense of the projectile is not excessive in cost, in comparison to the projectile of the standard ammunition for the weapon in use.

These and other objects of the invention, as well as the advantages thereof, will become clear from the disclosure which follows.

SUMMARY OF THE INVENTION

The present invention provides a training projectile which may be shaped externally similar to the Caliber .50, M33 ball, which is the standard ammunition to be fired from the M2 Machine Gun, or shaped similar to any other suitable ammunition.

Accordingly, the present invention comprehends a projectile or ball, which is suitable for use in limited range training ammunition, which has a projectile body having a tapered forward section, a cylindrical center section, and a tapered trailing section. A plurality of fins is mounted longitudinally on the tapered trailing section of the projectile body. The fins generate a spin dampening torque to cause gyroscopic instability and thereby create high aerodynamic drag upon the projectile when fired from the weapon of use.

In a particular embodiment of the present invention, the projectile tapered forward section has an ogival shape and the projectile body tapered trailing section has the configuration of a truncated cone. The projectile is further characterized by four straight fins mounted radially on the tapered trailing section of the projectile body at 90° intervals about the projectile body longitudinal axis.

A clearer understanding of the present invention will be obtained from the disclosure which follows when read in light of the accompanying drawings.

BRIEF DESCRIPTION OF THE DRAWINGS

The accompanying drawings illustrate various embodiments of the invention.

DESCRIPTION OF THE PREFERRED EMBODIMENTS

Figure 1:
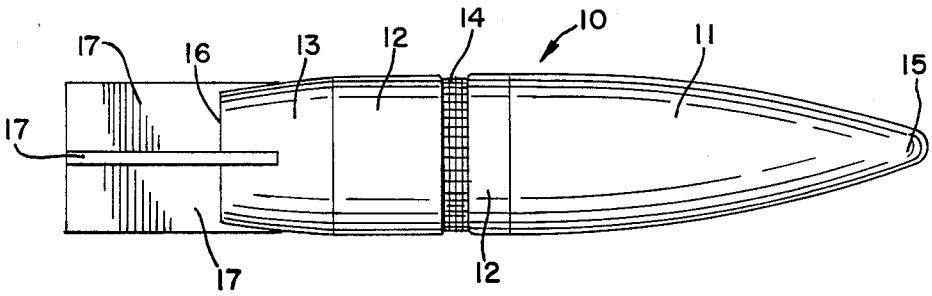
FIG. 1 is a front elevational view of the small caliber projectile of the present invention.
Figure 2:
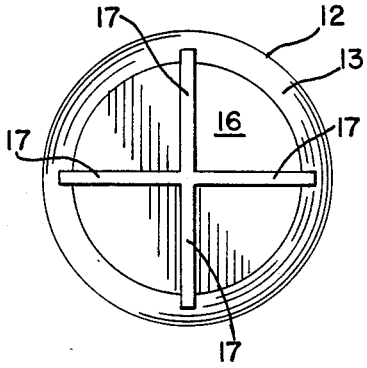
FIG. 2 is a left side elevational view of the projectile of FIG. 1, shown enlarged for purposes of clarity.

Referring now to FIGS. 1 and 2, there is shown a projectile 10 for limited range training ammunition. Projectile 10 has a projectile body containing a tapered forward or leading section 11, a cylindrical center section 12, and a tapered rearward or trailing section 13. The cylindrical center section 12 contains a circumferential recess 14 for clamping a copper jacket or cartridge casing to the projectile body. As illustrated, the circumferential recess 14 preferably has a knurled surface. The tapered forward or leading section 11 may have a conical configuration, but it preferably has an ogival configuration, as illustrated, since this is the shape of the standard Caliber .50, M33 ball. A spherical nose 15 is located on the leading end of the ogival forward section 11. This rounded or spherical nose is generally less than a full hemisphere. It may be a portion of a hemisphere of a circular sphere or it may be a portion of an elliptical sphere. Preferably, the nose curvature for the spherical nose 15 is designed to match the aerodynamic axial force of the standard service projectile. The tapered rearward or trailing section 13 preferably is in the form of a truncated cone.

A circular trailing end face 16 is on the rear end of conical section 13. A plurality of straight fins 17 is mounted on the trailing conical end section 13 and the trailing end face 16. As shown in FIGS. 1 and 2, it is preferred that the plurality of fins be four fins mounted radially on the tapered trailing section at 90° intervals about the longitudinal axis of the projectile body. However, it is within the scope of the invention to have fewer or more straight fins as may be desired.

The presence of the fins on the projectile body has two influences in its flight. The first influence is to decrease the spin of the projectile in order to induce gyroscopic instability. The second influence is to produce high drag at high angles of attack or high angles of incidence with respect to the air stream. When the projectile is nose-on into the air stream, the fins have little effect on drag, but as the spin decreases, the projectile begins to yaw in a conical oscillation so that the fins begin to take more and more effect, and greater and greater aerodynamic drag is created until the projectile tumbles to the earth.

This is in direct contrast to the effect of the prior art fins on other devices such as bombs, rockets, torpedoes, and mortar projectiles. The fins on such devices are used to weathervane the device in its flight. That is to say, the fins point into the wind or air stream flowing over the device in flight (water stream in the case of a torpedo), so that when the device begins to pivot, the fins act as a weather vane in the wind to bring the device back into alignment with the flight path and keep it stable. Thus, the prior art fins act to keep the device stable in flight and thereby maximize accuracy and range, whereas the fins of the present invention act to destabilize the device in flight and minimize range.

Projectiles of the present invention have been tested on the small caliber range at Fort Dix, N.J. on the M2 Machine Gun. The results have shown that the inventive projectile matched the ball of the standard service round to velocities having a Mach number of from about 1.48 to about 1.58. The projectiles thereafter became unstable at lower velocities. The distance that corresponds to this range of Mach numbers is from about 975 meters to about 1100 meters, and the predicted maximum range for the inventive projectile was found to be about 1600 meters. This means that all projectiles become unstable and begin to tumble and fall in the range of from about 975 to 1100 meters, and that no matter what elevation the weapon is fired at, all projectiles will be on the ground before reaching 1600 meters. Moreover, the test showed that the inventive projectile recycles the M2 Machine Gun without any problems.

Figure 3:
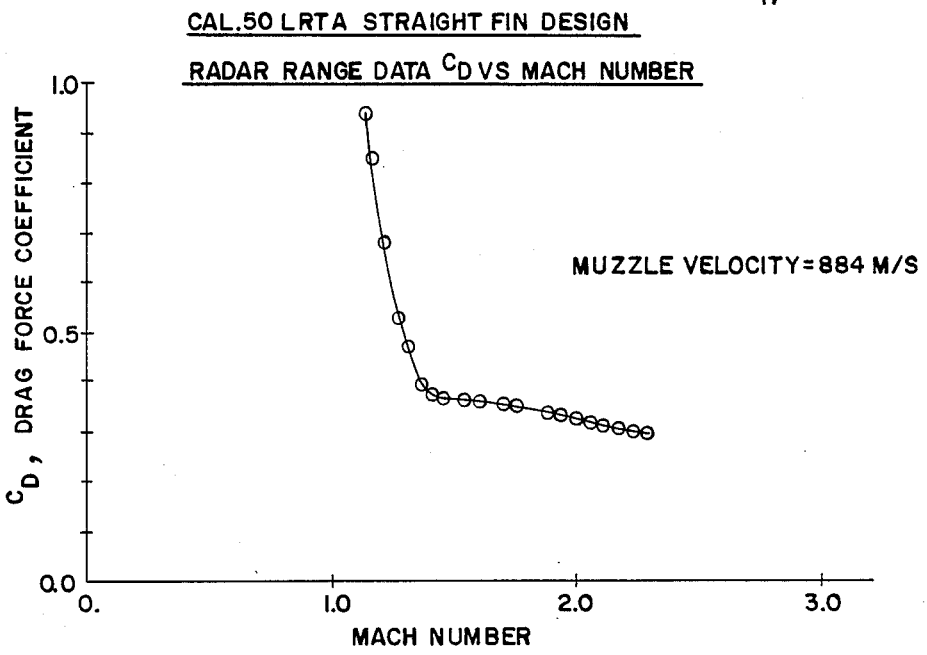
FIG. 3 is a graph of drag force coefficient versus projectile velocity in Mach number.

FIG. 3 provides an indication of the test results from the Fort Dix small caliber range. It shows the rapid increase in aerodynamic drag at the aforementioned Mach number, thereby limiting the range of the projectile. It will be seen that as the velocity is reduced, the drag coefficient increases at a low rate, but upon reaching a Mach number of from about 1.48 to about 1.58, the drag force coefficient increases greatly at a rapid rate. This is the point at which the projectile becomes unstable and begins to tumble and fall to the earth. In the title of FIG. 3, the term "CAL.50 LRTA" means Caliber .50 Limited Range Training Ammunition.

The Caliber .50 projectiles which were tested at Fort Dix had the appearance of the projectile shown in FIG. 1, with an ogival nose and four straight fins radially mounted about the longitudinal axis at 90° intervals. The overall length of the projectiles was about 2.821 inch. The surface of the ogival forward section 11 had a curvature having a radius of about 4.0 inches and the radius of the spherical nose 15 was about 0.039 inch. The length of the ogival forward section 11 was about 1.365 inches and the length of the cylindrical section 12 was about 0.559 inch. The tapered section 13 had a length of about 0.386 inch and it had a slope of 7°±30′.

The knurled recess 14 had a width of about 0.080 inch and its forward edge was about 1.500 inches from the nose of the projectile. The fins extended back about 0.511 inch from the trailing face 16, and they had a thickness of about 0.031 inch. The projectiles had an outer diameter of about 0.511 inch through the cylindrical center section 12, and the outer diameter of the fins was about 0.464 inch. Thus, the fins had an outermost radial dimension which was less than the outermost radial dimension of the projectile body, and the forward end of the fins terminated on the sloped surface of the tapered trailing section 13 intermediate the trailing end face 16 and the junction line between the tapered trailing section 13 and the cylindrical center section 12, as shown in FIGS. 1 and 2. Those skilled in the art will recognize that when the projectile is contained within a cartridge casing or jacket, the fins must have an outermost radial dimension which is not greater than the outermost radial dimension of the projectile or the inner radial dimension of the jacket, so that the finned projectile can fit within the jacket.

Although the tests of the inventive projectile were made with Caliber .50 balls of the present invention being fired from the M2 Machine Gun, projectiles of the present invention also will be useful in limited range training ammunition for other small caliber weapons. The inventive balls will preferably use a copper jacket externally and a soft steel core. However, the invention is not limited to small caliber ammunition. It also has utility for larger projectiles, such as those projected by mortar or artillery, where a limited range is required.

It is important to note that the length of the fins must be sufficient to impart a spin dampening torque on the otherwise spin stabilized projectile during flight in order to cause gyroscopic instability and thereby create high aerodynamic drag. As noted hereinabove, the fins on the Caliber .50 projectile of FIG. 1 extended back about 0.511 inch from the trailing face 16. This dimension will differ for different size projectiles, and the length needed for a given size projectile can only be determined by empirical testing.

The foregoing disclosure and drawings are merely illustrative of the principles of this invention and are not to be interpreted in a limiting sense. We wish it to be understood that we do not desire to be limited to the exact details of construction shown and described because obvious modifications will occur to a person skilled in the art.

We claim:

1. In combination, a projectile for use on a limited range training ammunition consisting essentially of:

a. a projectile body having a tapered ogival forward section, a cylindrical center section, and a tapered conical trailing section,
   1. said tapered ogival forward section having a rounded leading nose,
   2. said cylindrical center section having a circumferential recess for the clamping of a cartridge case to said projectile body
      a. said recess having a knurled surface,
   3. said conical tapered trailing section having the configuration of a truncated cone,
      a. said tapered conical trailing section terminating in a circular trailing end face, b. a plurality of straight fins mounted longitudinally on said tapered conical trailing section for generating spin dampering torque to cause gyroscopic instability thereby creating high aerodynamic drag upon said projectile when fired from a weapon, 1. said fins mounted on the surface of said truncated cone,
2. said fins mounted on said tapered trailing section at 90° intervals about said projectile body, 3. said fins extending rearwardly from said tapered trailing section, and
4. said fins terminating beyond said circular trailing end face,
5. said fins having an outermost radial dimension not greater than the outermost dimension of said projectile body.

* * * * *